United States Patent
Kaneda et al.

(10) Patent No.: US 7,471,904 B2
(45) Date of Patent: Dec. 30, 2008

(54) METHOD AND APPARATUS FOR ELECTRONIC EQUALIZATION IN OPTICAL COMMUNICATION SYSTEMS

(75) Inventors: Noriaki Kaneda, Eatontown, NJ (US); Ut-Va Koc, Bridgewater, NJ (US); Kun-Yii Tu, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 608 days.

(21) Appl. No.: 10/627,098

(22) Filed: Jul. 25, 2003

(65) Prior Publication Data

US 2005/0019042 A1 Jan. 27, 2005

(51) Int. Cl.
*H04B 10/06* (2006.01)
(52) U.S. Cl. .................................................... 398/208
(58) Field of Classification Search ............... 398/208; 375/316, 225, 23, 246, 2
See application file for complete search history.

(56) References Cited

U.S. PATENT DOCUMENTS

| | | | | |
|---|---|---|---|---|
| 5,048,058 | A * | 9/1991 | Kaleh | 375/274 |
| 6,718,087 | B2 * | 4/2004 | Choa | 385/27 |
| 7,130,366 | B2 * | 10/2006 | Phanse et al. | 375/350 |
| 2003/0189998 | A1 * | 10/2003 | Phanse et al. | 375/348 |

OTHER PUBLICATIONS

A. Zerguine, "Convergence Behavior of the Normalized Least Mean Fourth Algorithm", IEEE 2000.*
"Optical Network: A practical Perspective", Second Edition, by R. Ramaswami et al., Morgan Kaufmann, 2002, pp. 258-263.*
D. G. Messerschmitt, "Minimum MSE Equalization of Digital Fiber Optic Systems," IEEE Trans. Communications, vol. COM-26, No. 7, 1110-1118 (Jul. 1978).
E. Wallach et al., "The Least Mean Fourth (LMF) Adaptive Algorithm and its Family," IEEE Trans. Communications on Information Theory, vol. IT-30, No. 2, 275-273 (Mar. 1984).
Dietrich Marcuse, "Calculation of Bit-Error Probability for a Lightwave System with Optical Amplifiers and Post-Detection Gaussian Noise", Journal of Lightwave Technology, vol. 9, No. 4, Apr. 1991.

* cited by examiner

*Primary Examiner*—Shi K Li

(57) ABSTRACT

A method and apparatus are provided for performing electronic equalization in optical communication systems. Coefficient values in equalizers, such as feed forward equalizers or decision feedback equalizers, are updated using higher-order algorithms in the Least-Mean-2Nth-Order family. An optical receiver includes a photo-detector for converting a received optical signal to an electrical signal; and an equalizer for removing intersymbol interference from the electrical signal, wherein coefficients of the equalizer are updated based upon a least-mean $2N^{th}$-order (LMN) algorithm (N is greater than one). Feed forward equalizer and decision feedback equalizer implementations are disclosed. The non-symmetric nature of optical noise is addressed by varying A slicer threshold based on an incoming signal distribution to reduce bit errors.

18 Claims, 3 Drawing Sheets

METHOD AND APPARATUS FOR ELECTRONIC EQUALIZATION IN OPTICAL COMMUNICATION SYSTEMS

FIELD OF THE INVENTION

The present invention relates generally to signal equalization techniques, and more particularly, to methods and apparatus for equalizing optical signals.

BACKGROUND OF THE INVENTION

The explosive growth of digital communications technology has resulted in an ever-increasing demand for bandwidth for communicating digital information, such as data, audio and/or video information. To keep pace with the increasing bandwidth demands, optical communication systems, with their large inherent channel capacities, frequently provide the backbone of modern communication systems. It is believed that the growth of fiber optic communications will continue for metropolitan and long-haul networks and that fiber optic communications will ultimately be applied even for access and local area (LAN) networks. In this on-going evolution of fiber optic communication, adaptive electronic equalization for combating impairments in fiber optic communication may play an important role in the following themes:

Adaptive electronic equalizers for impairment compensation in fiber optic networks have been frequently studied. Initially, the dominant noise was quantum, shot or electronic thermal noise, which can be modeled effectively as additive Gaussian noise. Since the advent of efficient and low-noise fiber amplifiers in 1987, optical amplifiers have been used extensively to increase the transmission distance without conversion between the optical and electrical domains. A number of studies have explored a variety of equalizer structures for adaptive optical channel impairment compensation (ranging from feed forward type equalizers to maximum-likelihood estimators). More recently, interest is more focused on adaptive polarization mode dispersion (PMD) compensation since, in the wide-spread deployment of 10 Gbps optical equipment, substantial unpredictable PMD is accumulated over a long distance of legacy fibers, enough to cause network outage, though polarization mode dispersion compensation still remains an open topic. A need therefore exists for improved techniques for compensating for polarization mode dispersion and other noise in optical receivers.

SUMMARY OF THE INVENTION

Generally, a method and apparatus are provided for performing electronic equalization in optical communication systems. Optical noise in an optical receiver has a non-Gaussian nature. The present invention updates coefficient values in equalizers, such as feed forward equalizers or decision feedback equalizers, using higher-order algorithms in the Least-Mean-2Nth-Order family. In one embodiment, an optical receiver includes a photo-detector for converting a received optical signal to an electrical signal; and an equalizer for removing intersymbol interference from the electrical signal, the equalizer having a plurality of coefficients that are configured to be updated based upon a least-mean $2N^{th}$-order (LMN) algorithm, where N is greater than one.

The equalizer can be embodied as a finite impulse response filter that is configured to produce a first output signal responsive to the electrical signal. The first output signal is representative of a sum of associated electrical signals plus a weighted sum of previous electronic signals, where the previous signals are weighted by said coefficients. A slicer produces a predicted signal for each first output signal received from the finite impulse response filter; a subtractor produces an error signal proportional to the difference between the first output signal and corresponding ones of predicted signals and training signals; and a controller updates the coefficients responsive to the error signal.

In a feed forward equalizer implementation, the controller updates a set of coefficients $\vec{c}(k+1)$ at a time (k+1) as $\vec{c}(k)+\beta N[e(k)]^{2N-1}\vec{u}(k)$, wherein $\beta$ is a preset step size, $\vec{c}(k)$ and $e(k)$ are respective sets of coefficient and error signals at a time k, and $\vec{u}(k)$ is an input signal at the time k.

In a decision feedback equalizer implementation, a first subtractor produces a second output signal that is a sum of one of the first output signals and a corresponding feedback signal; a slicer produces a predicted signal in response to each second output signal; a second subtractor produces an error signal representing a difference between the second output signal and a corresponding training signal or predicted signal; a feedback filter produces the feedback signal in response to corresponding ones of the predicted or training signals, the feedback signal being a weighted sum of the predicted or training signal, wherein weights in the sum being characteristics of the filter; and a controller updates the set of weights in response to the error signal, wherein the controller is configured to perform the updates based upon a least-mean $2N^{th}$-order (LMN) algorithm where N is greater than one. The controller updates a set of the weights $\vec{w}(k+1)$ at a time (k+1) as $\vec{w}(k)+\beta N[e(k)]^{2N-1}\vec{r}(k)$, wherein $\beta$ is a preset step size, $\vec{w}(k)$ and $e(k)$ are respective sets of weight and error signals at a time k, and $\vec{r}^T(k)=[\vec{u}(k),-\vec{a}(k)]$, where $\vec{u}(k)$ is an input signal at the time k, and $\vec{a}(k)$ is a predicted or training signal at the time k.

Another aspect of the invention addresses the non-symmetric nature of optical noise by employing adjustable slicer threshold control techniques to reduce bit errors (rather than employing a fixed threshold at the mid-point of two noiseless signal levels). A photo-detector converts an optical signal to an electrical signal; and a slicer produces a predicted signal in response to each input signal based upon a slicing threshold. The slicing threshold is varied based upon a signal distribution of the electrical signal.

A more complete understanding of the present invention, as well as further features and advantages of the present invention, will be obtained by reference to the following detailed description and drawings.

DETAILED DESCRIPTION

Figure 1:
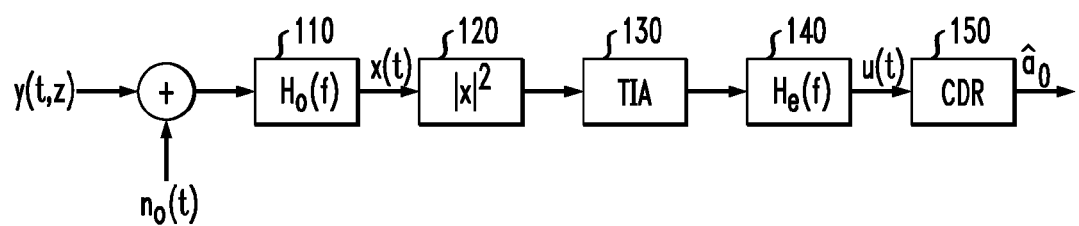
FIG. 1 is a schematic block diagram of a conventional optical receiver.

After the square-law detection in a photodiode of an optical receiver, the incoherent amplified spontaneous emission (ASE) noise induced in optical amplifiers becomes non-Gaussian, though a small amount of ASE can be effectively approximated as Gaussian. The present invention recognizes that the well-studied least-mean-square (LMS) algorithm, which is typically used to update equalizer coefficients, becomes suboptimal for optical noise in the sense that an optical signal-to-noise ratio (OSNR) penalty is observed even without the presence of PMD-induced intersymbol interference (ISI), though it is optimal for additive Gaussian noise. Various coefficient-dithering approaches were devised to replace LMS but generally suffer from slow adaptation rate and no guarantee of convergence. Typically, tap coefficients are adjusted in a trial-and-error manner with feedback from various types of error monitors, such as minimization of eye-monitoring pseudo-error count, maximization of eye-opening, Q-factor optimization, bit-pattern dependent threshold control, RF power maximization, or FEC-error-count minimization.

Despite continued research in the area, an electronic equalizer for optical receivers has still not been implemented. First, since the bit rate in fiber optic communication systems is typically 10 Gbps or above, it is difficult to implement complicated algorithms, as opposed to the case of the comparatively low bit rates associated with wireless communications. In addition, the nonlinear nature of a fiber optic channel provides additional challenges. The nonlinear nature of a fiber optic channel is due to the quadratic detection of photons (electromagnetic waves in the ultra high frequency range) instead of electrical field detection in electronic wired or wireless communications. Electronic compensation deals with noise and ISI after quadratic detection, but most readily-used electronic compensation algorithms are based on a linear system and are thus less effective in such a fiber optic environment.

The present invention recognizes that optical noise after the square-law optical to electrical conversion in an optical receiver will have a non-Gaussian nature. In addition, the present invention recognizes that higher-order statistic techniques in the least-mean $2N^{th}$-order (LMN) family are better suited for updating equalizer coefficients in the presence of non-Gaussian noise than the typical LMS algorithm.

Thus, one aspect of the present invention updates coefficient values in equalizers, such as FFE or DFE equalizers, using higher-order algorithms in the Least-Mean-2Nth-Order family. In addition, due to the non-symmetric nature of optical noise, another aspect of the invention employs adjustable slicer threshold control techniques based on an input signal distribution to minimize bit errors (rather than employing a fixed threshold at the mid-point of two noiseless signal levels).

Optical Noise Background

In a fiber optic link, a number of optical amplifiers, either erbium-doped fiber amplifiers (EDFA) or Raman amplifiers (RA), are typically employed to strengthen the optical signal, but at the same time add in the incoherent amplified spontaneous emission (ASE) noise (commonly called optical noise). In the quantum regime, the ASE noise follows the Bose-Eistein distribution and the optically amplified coherent light exhibits a noncentral-negative-binomial distribution.

As previously indicated, after square-law detection using a photodiode in an optical receiver, the noise becomes non-Gaussian (even though a small amount of ASE can be approximated as effectively Gaussian). FIG. 1 is a schematic block diagram of a conventional optical receiver 100. As shown in FIG. 1, an optical receiver 100 typically filters the received optical signal using an optical filter 110, before converting the optical signal to an electrical signal using a photo-detector (diode) 120. The electrical signal is then amplified by an amplifier 130, and again filtered by an electronic filter 140, prior to performing a clock/data recovery process 150.

Precisely, the photocurrent I(t) induced in the photo-detector 120 is proportional to $P_N(t)$, the power of the noise-coupled optical signal $E(t)+n_0(t)$, where $E(t)=y(t, L)$:

$$I(t) \propto P_N(t) = |h_0(t) \otimes [E(t)+n_0(t)]|^2 = P(t) + 2R\{\tilde{E}(t)\tilde{n}_0^*(t)\} + |\tilde{n}_0(t)|^2 \quad (1)$$

Here $\tilde{E}(t)=h_0(t) \otimes E(t)$, $\tilde{n}_0(t)=h_0(t) \otimes n_0(t)$, and $P(t)=|h_0(t) \otimes E(t)|^2$ is the power of the noiseless optical signal E(t) convolved with the optical filter 110. Therefore, the effect of the optical filter 110 on the optical noise is to transform white noise to colored noise whose autocorrelation function is no longer a δ function:

$$E\{n_0(t_1)n_0(t_2)^*\} = \sigma^*_{ASE}\delta(t_1-t_2); \ E\{\tilde{n}_0(t_1)\tilde{n}_0^*(t_2)\} = \sigma^2_{ASE}\int h_0(t_1-\tau)h_0(t_2-\tau)d\tau \quad (2)$$

This photocurrent I(t) is then converted to a voltage signal by the transimpedance amplifier (TIA) 130, and further filtered by an electronic filter 140, $H_e(f)=\Im\{h_e(t)\}$, to generate the input signal u(t) for a clock-data-recovery (CDR) 150 in a conventional optical communication system:

$$u(t) \propto h_e(t) \otimes P_N(t) = h_e(t) \otimes P(t) + 2h_e(t) \otimes \Re\{\tilde{E}(t)\tilde{n}_0^*(t)\} + h_e(t) \otimes |\tilde{n}_0(t)|^2 \quad (3)$$

In addition to the noise filtering effect, $h_e(t)$ has an effect similar to that of $h_o(t)$ on the noise, making the resultant noise more correlated in time. This electronic low-pass filter can be modeled as a 3rd-order or 4th-order Bessel filter of bandwidth ranging from 7 GHz to 13 GHz at 10 Gbps. As a result, the noisy input signal u(t) contains a signal-dependent non-symmetric Gaussian second term having a variance determined by the signal levels of bits 0/1 and a nonzero-mean noncentral $\chi^2$ third term.

It should be noted that the mean of u(t) is nonzero and varies at different optical signal-to-noise ratio levels (OSNR). This noise property is different from common electronic thermal noise or even optical noise after the combination of an interferometer and a balanced receiver. The OSNR for a single polarization state is defined as the ratio of average signal power to noise power within a fixed bandwidth of 0.1 nm (or equivalently 12.5 GHz for the 1550 nm wavelength) in that polarization state before the optical filter 110:

$$OSNR = \frac{\int [|E_1(t)|^2 p(1) + |E_0(t)|^2 p(0)]dt/T}{\sigma_{ASE} * 12.5GHz} \quad (4)$$

where $E_0(t)$ is the noiseless optical field for bit 0 when the extinction ratio $ER=\int |E_1(t)|^2 dt / \int |E_0(t)|^2 dt$ is finite, and p(1) or p(0) are the probabilities of bits 1 and 0, respectively.

Electronic PMD Compensators

Figure 2:
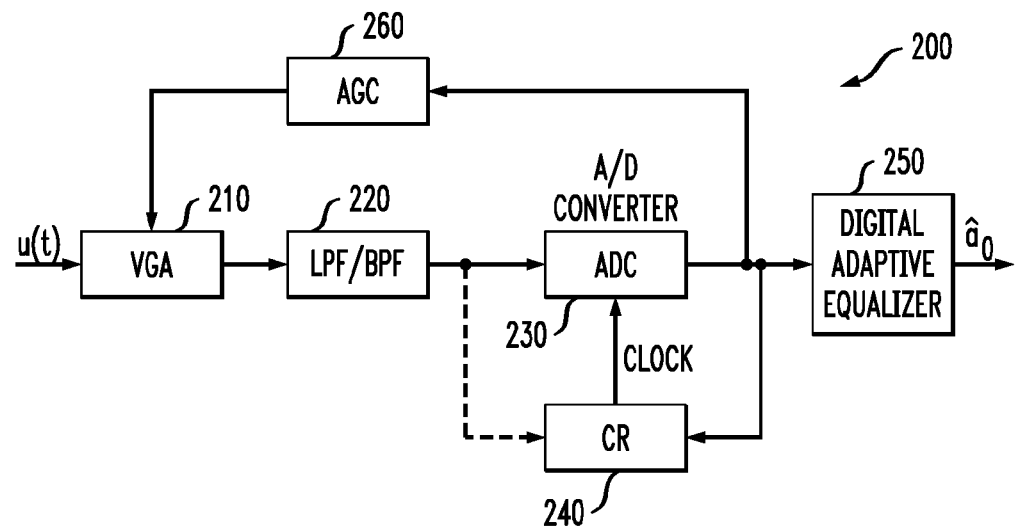
FIG. 2 is a schematic block diagram of a conventional digital optical receiver.
Figure 3:
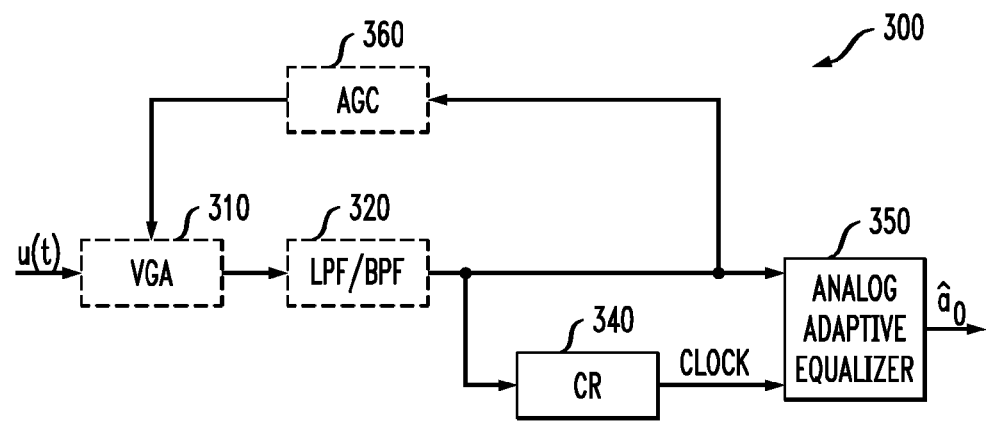
FIG. 3 is a schematic block diagram of a conventional analog optical receiver.

FIGS. 2 and 3 illustrate exemplary conventional architectures for digital and analog receivers, respectively. As shown in FIG. 2, the digital receiver architecture 200 includes a variable gain amplifier 210, an anti-aliasing filter 220, an analog-to-digital converter 230, a clock recovery circuit 240, an adaptive equalizer 250, and an automatic gain control stage 260, that operate in a well known manner. Of interest here, the analog-to-digital converter 230 digitizes the incoming band-limited analog signal for further processing in the digital adaptive equalizer. Though more complex functionality can be achieved in low-power CMOS digital circuitry coupled with pipelined/parallel data flows after digitization, the ADC 230 is considered one of the bottlenecks for digital implementation of advanced equalizers. The current state-of-art ADC can provide about 6-bit accuracy at 10 Gbps but it becomes challenging at 40 Gbps. Furthermore, the power consumption of the ADC 230 at such a high speed may offset the low-power benefit of digital CMOS circuits.

As shown in FIG. 3, the analog receiver architecture 300 optionally includes a variable gain amplifier 310 and anti-aliasing filter 320 and includes a clock recovery circuit 340, an adaptive equalizer 350, and an automatic gain control stage 360, that operate in a well known manner. The analog receiver architecture 300, and particularly the simple analog tapped-delay-line equalizer, is an attractive alternative in the absence of ADC for providing a practical electronic PMDC (EPMDC) solution. Regardless of the adopted implementation (digital or analog), the operations of an equalizer can be described in the discrete-time Z-domain. Equalizer algorithms are expressed herein in the discrete-time domain without explicitly referring to a digital or analog implementation.

Equalizer Architectures

A number of electronic equalizer structures, such as feed-forward equalizers (FFE), decision feedback equalizers (DFE), maximum likelihood sequence estimators (MLSE), and maximum a posteriori (MAP) equalizers, have been considered. MLSE/MAP typically have substantial complexity and compromises are often associated with a practical implementation. Specifically, MLSE/MAP implementations have exponential complexity $O(e^N)$, while FFE/DFE techniques require only linear complexity $O(N)$. Nonetheless, FFE/DFE implementations offer adequate performance.

Figure 4:
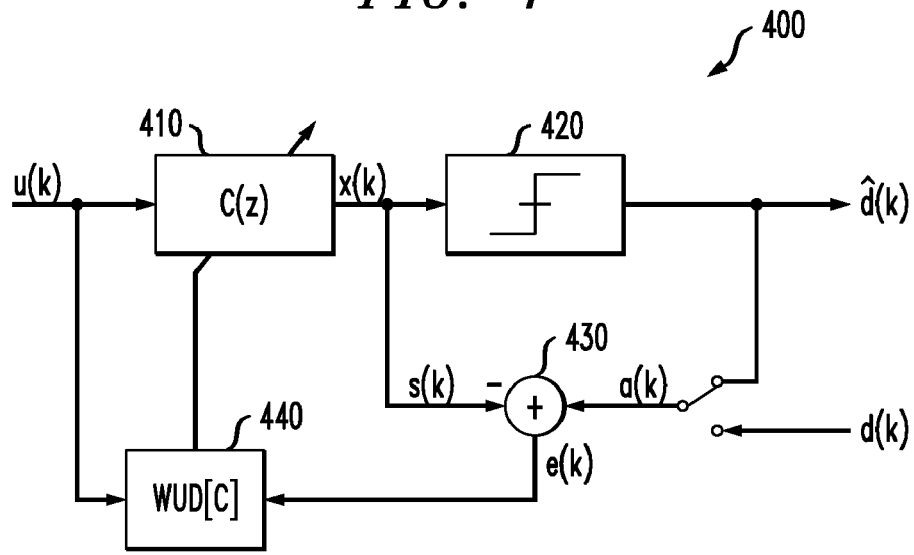
FIG. 4 is a schematic block diagram of a feed forward equalizer incorporating features of the present invention.
Figure 5:
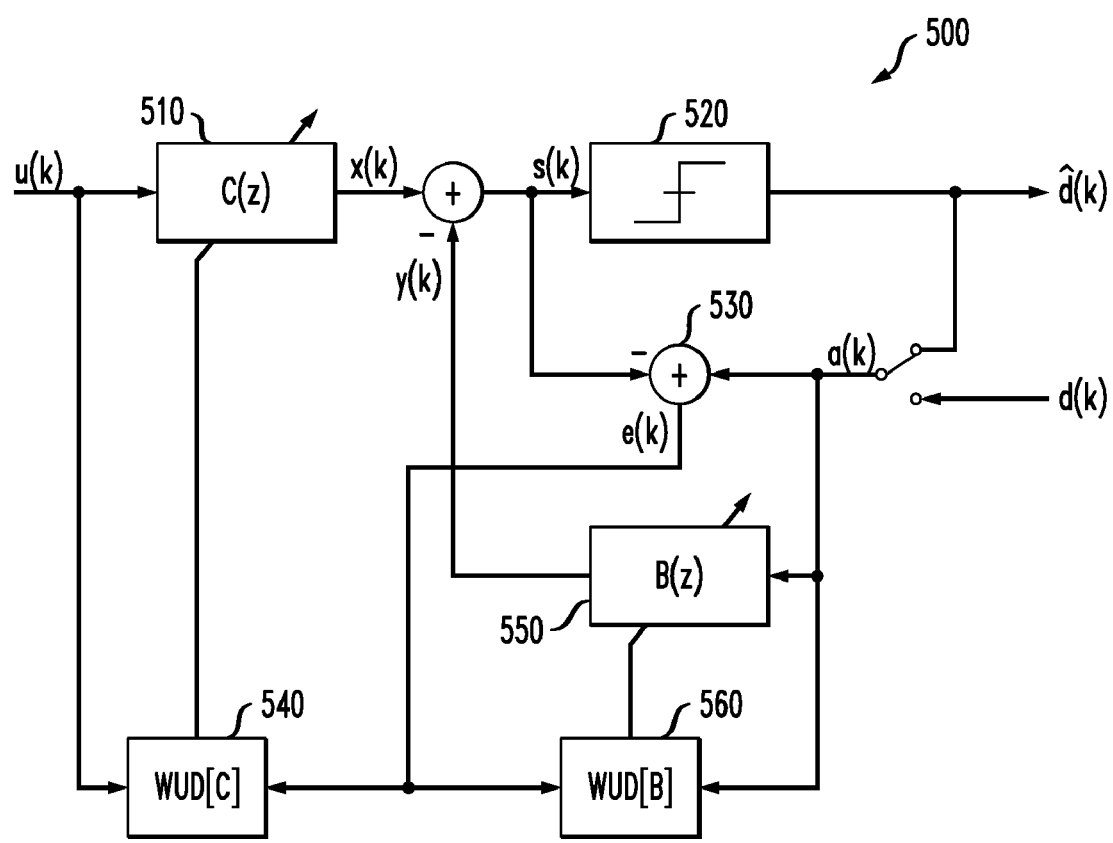
FIG. 5 is a schematic block diagram of a decision feedback equalizer incorporating features of the present invention.

FIGS. 4 and 5 are schematic block diagrams of a feed forward equalizer (FFE) 400 and a decision feedback equalizer (DFE) 500, respectively, incorporating features of the present invention. As shown in FIG. 4, the feed forward equalizer 400 includes a finite impulse response (FIR) filter 410, a slicer 420, an adder 430 and a weight update unit 440. The N-tap FFE coefficients are $\{c_{-L}(k), \ldots, c_L(k)\}$ for $N=2L+1$ at $t=kT_s$ in the discrete-time domain. Here $T_s=1/f_s$ is the sample period. It is noted that $C(z)=Z\{c(k)\}$ and both $C(z)$ and $c(k)$ therefore refer to the FFE coefficients. If the oversampling ratio, $R$ ($T/T_s$) is greater than 1, then the FFE is called a fractionally-spaced equalizer. In vector form, these weights can be denoted as $\vec{c}^T(k)=[c_{-L}(k), \ldots, c_L(k)]$. The input data sequence is $\vec{u}^T(k)=[u(k+L), \ldots, u(k-L)]$. Therefore, the slicer input, $s(k)=x(k)=\vec{c}^T(k)\vec{u}(k)$. The weight updating unit 440 of C(z) (WUD{C}) adapts a set of coefficient values, $\vec{c}(k)$, based on an adaptive algorithm. In conventional equalizers the least-mean-square (LMS) algorithm has been widely used. To make a hard decision, the slicer 420 determines the estimated symbol $\vec{d}(k)$ (or bit in the On-Off Keying (OOK) case) in reference to a slicer threshold $s(k)$. The decision point (slicer threshold $\theta$) is typically fixed at the mid-point of two noiseless signal levels. For the case of only two signal levels, the slicer is simply a high-speed comparator as used in a conventional clock-data-recovery (CDR).

FIG. 5 is a schematic block diagram of a decision feedback equalizer 500 incorporating features of the present invention. As shown in FIG. 5, the decision feedback equalizer 500 includes a finite impulse response filter 510, a slicer 520, an adder 530, a feedback equalizer 550, a weight update unit (WUD(C)) 540 and a weight update unit (WUD(B)) 560. Thus, the decision feedback equalizer 500 includes both an FFE 510 and a feedback equalizer (FBE) 550, where $s(k)=x(k)-y(k)=\vec{c}^T(k)\vec{u}(k)-\vec{b}^T(k)\vec{a}(k)$ with the set of coefficients of the FBE filter defined as $\vec{b}^T(k)=[b_1(k), \ldots, b_M(k)]$. Here $\vec{a}^T(k)=[a(k-1), \ldots, a(k-M)]$ with $a(k)=d(k)$ (desired symbol) in the training mode, but $a(k)=\hat{d}(k)$ (estimated symbol) in the normal operating mode. The weight updating units for FFE and FBE are denoted as WUD(C) and WUD(B) respectively and can employ a variety of adaptive algorithms as in the case of the FFE.

Higher-Order Statistics—Least-Mean $2N^{th}$-Order (LMN) Algorithms

It has been shown that the LMS algorithm is efficient under the assumption of temporal whiteness and Gaussian disturbances, providing theoretical justification for the excellent robustness of LMS. However, after square-law detection by a photodiode, optical noise becomes nonzero-mean signal-dependent $\chi^2$. As a result, the conventional LMS algorithm introduces an OSNR penalty even without PMD, although the LMS algorithm is optimal for additive Gaussian noise (e.g., thermal noise). Due to the non-Gaussian nature of optical noise, the present invention employs the higher-order counterparts of LMS which are found to yield better results than LMS.

Thus, according to the present invention, the weight updating unit 440 (WUD{C}) in the FFE 400 adopts an algorithm in the LMN family with order N greater than one minimizing the cost function, $J(k)=E\{[e(k)]^{2N}\}$ where the slicer error, $e(k)$, equals $a(k)-s(k)$. Here, the desired signal $a(k)$ equals $\hat{d}_k$ in the normal operating mode whereas $a(k)$ equals $d(k)$ in the training mode. At a time $(k+1)$, the algorithm uses the values of $\vec{c}(k)$, $e(k)$ and $\vec{u}(k)$ from previous time k to determine updated coefficients $\vec{c}(k+1)$ as follows:

$$\vec{c}(k+1) = \vec{c}(k) - \frac{\beta}{2}\nabla c\{[e(k)]^{2N}\} = \vec{c}(k) + \beta N[e(k)]^{2N-1}\vec{u}(k) \quad (5)$$

where $\beta$ is the preset step size. For N equal to 1, the LMN algorithm becomes LMS. For N equal to 2, it is called the least-mean fourth-order (LMF) algorithm. The present invention employs algorithms where N is greater than one. Since LMS belongs to the LMN family, the extensive knowledge of LMS in both theory and implementation can also be applied to the LMN family.

In a similar way, consider the DFE 500 shown in FIG. 5, where $e(k)=a(k)-s(k)$, and $s(k)=x(k)-y(k)=\vec{c}^T(k)\vec{u}(k)-\vec{b}^T(k)\vec{a}(k)$. Define $\vec{w}^T(k)=[\vec{c}(k),-\vec{b}(k)]$ and $\vec{r}^T(k)=[\vec{u}(k),-\vec{a}(k)]$ where $\vec{c}^T(k)=[c_{-L}(k) \ldots c_L(k)]$, $\vec{u}^T(k)=[u(k+L) \ldots u(k-L)]$, $\vec{b}^T(k)=[b_1(k) \ldots b_M(k)]$, $\vec{a}^T(k)=[a(k-1) \ldots a(k-M)]$. The variable e(k) can be rewritten as $a(k)-\vec{w}^T(k)\vec{r}(k)$. Therefore, the set of coefficients of the FFE and FBE (feedback equalizer) are updated at a time (k+1) as follows to minimize the cost function, $J(k)=E\{[e(k)]^{2N}\}$:

$$\vec{w}(k+1) = \vec{w}(k) - \frac{\beta}{2}\nabla w\{[e(k)]^{2N}\} = \vec{w}(k) + \beta N[e(k)]^{2N-1}\vec{r}(k) \quad (6)$$

The first and second moments (equivalently mean and variance) are sufficient to describe Gaussian noise distributions. As a result, it is not necessary to account for higher moments in the cost function and the second-order cost function in LMS is enough for Gaussian noise. For non-Gaussian noise, higher moments are required. Intuitively, the higher-order cost function wages a large penalty for a large slicer error to account for higher moments and cause the noise distribution to be more compact for non-Gaussian noise.

Slicer With Automatic Threshold Control (ATC-SLICER)

In the uncompensated on-off keying case, the two noiseless signal levels for bits values 0 and 1 are normalized to 0 and 1 with the mid-point defined at 0.5 (or equivalently to {−1, 1} with the mid-point at 0). In view of the non-symmetric distributions for bits 0 and 1 (having different variances) reflected in the signal-dependent second term in Equation 1 after square-law detection, the present invention recognizes that the optimal threshold point is usually not the mid-point (i.e., is usually not the value of 0.5 for the bit values 0 and 1). Therefore, another aspect of the invention provides an automatic threshold control (ATC) algorithm to track the incoming signal profile and automatically adjust the threshold in the CDR for a reduced bit error rate.

In theory, an ATC algorithm can search an entire simulation sequence for the best threshold value to obtain the least number of bit errors. In a practical system, however, the ATC algorithm can accumulate signal distribution information within a window of finite duration for optimal threshold calculation to allow tracking of slowly varying non-stationary channels. When the signal distribution information is accumulated at repetitive time instants over a period of time, a "histogram" of the distribution is obtained. The histogram will reveal a "broadening" of the noise distribution for bit 1 in comparison to that for bit 0 and can be used to identify a slicer threshold that will provide a reduced bit error rate.

In the equalizer structures illustrated in FIGS. 4 and 5, the decision point (slicer threshold, θ) is fixed at the mid-point of two noiseless signal levels. Similar to the uncompensated case, the slicer input distributions for bits 0 and 1 are also non-symmetric and thus result in the optimal threshold point being away from the midpoint in certain cases.

Figure 6:
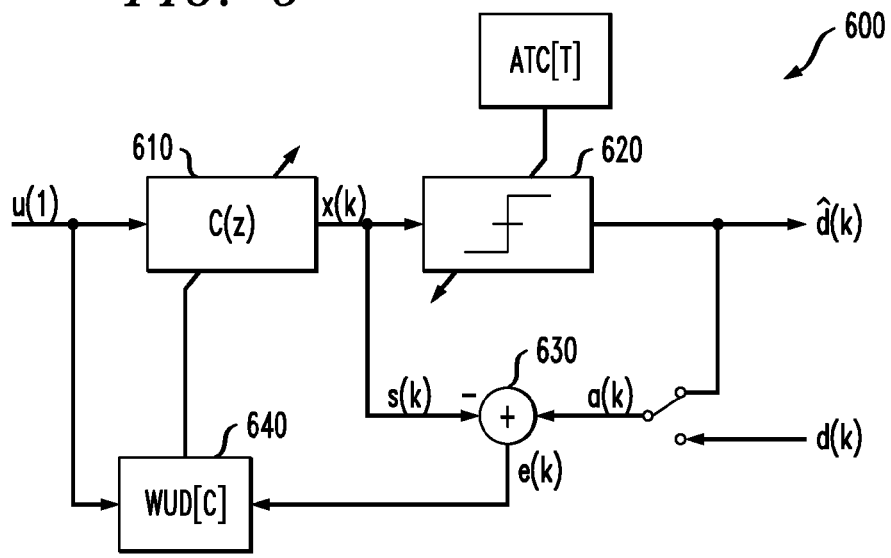
FIG. 6 is a schematic block diagram of an alternate embodiment of the feed forward equalizer of FIG. 4 having adjustable slicer threshold control.
Figure 7:
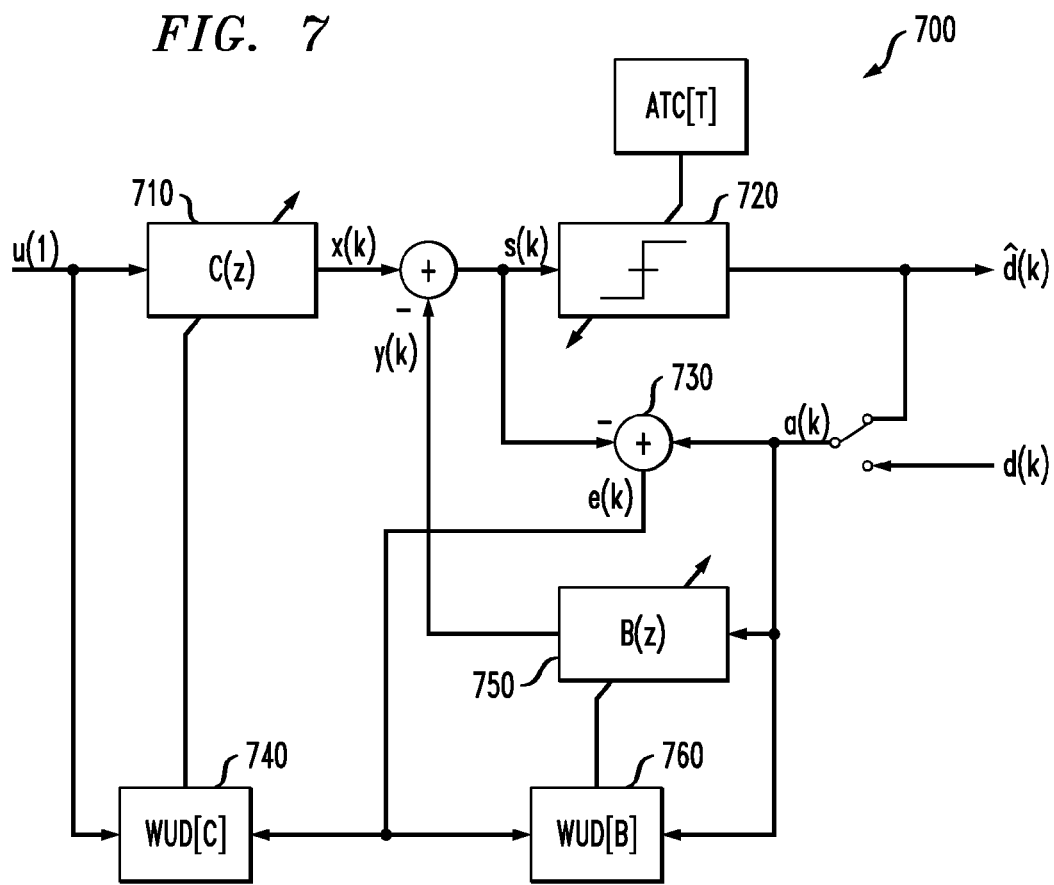
FIG. 7 is a schematic block diagram of an alternate embodiment of the decision feedback equalizer of FIG. 5 having adjustable slicer threshold control.

According to another aspect of the present invention, shown in FIGS. 6 and 7, alternative architectures for FFE/DFE are provided with adjustable threshold control in the slicer 620, 720 (ATC-SLICER). Other than the adjustable threshold control in the slicer 620, 720, the feed forward equalizer 600 and decision feedback equalizer 700 operate in the same manner as discussed above in conjunction with FIGS. 4 and 5, respectively. The function of the ATC-SLICER 620, 720 is to track the slicer input histogram and adjust the slicer threshold accordingly.

After a cold startup of the weight-update unit 640, 740 utilizing blind equalization algorithms, such as reduced constellation algorithm (RCA) or constant modulus algorithm (CMA), the ATC-SLICER 620, 720 can start to build up a slicer input profile to determine the best threshold for the slicer, and then dynamically track and adjust the optimal slicer threshold. In a digital implementation, an ADC is needed to convert the 10 Gbps signal to digital values and the number of digital values required must be determined through fixed-point analysis to minimize the impact of accuracy-induced performance degradation. After digitization, a highly pipelined and parallel data-flow architecture can be devised to allow real time processing of the digitized signal.

In an analog implementation form, no ADC is needed, but a number of tap-delayed amplifiers with an analog adder form a finite impulse response (FIR) filter as the basis of FFE/FBE. The ATC-SLICER 620, 720 can be implemented as a high-speed comparator with the threshold controlled by an external device that collects the compensated signal distribution over time. A mixed-signal implementation is also possible by utilizing the high-speed analog FFE/FBE with low-speed digital WUD.

Automatic threshold control techniques (ATC) typically process raw analog input from the transimpedance amplifier (TIA). For the adaptive equalization associated with an aspect of the present invention, the input to the ATC-SLICER control block is the slicer input s(k). In one of many possible digital implementations, a histogram is established in two arrays of memory, $bin_1(i)$ and $bin_0(i)$, for i=0, ..., B+1 corresponding to the intervals {(−inf,−1),[−1,−1+d),[−1+d,−1+2d), ... ,[−1+(i−1)d,−1+id), ... ,[1−d,1],(1,inf)}, where d=2/B and B is the number of bins that form the range from −1 to 1. The value of B dictates the accuracy of the final threshold determination but a large B value requires more memory space. For example, B could be 128, 256 or 1024. If s(k) is in the interval of [−1+(i−1)d, −1+id), then the count in the memory $bin_1(i)$ is incremented by one for the slicer output having a value of 1 and $bin_0(i)$ is incremented for the slicer output having a value of 0. The bit error can be estimated as follows:

$e(0)=bin_1(0)-bin_0(0)$, $e(i)=e(i-1)+bin_1(i)-bin_0(i)$, for i=1, ..., B+1.

The optimal threshold is determined by finding the minimum of {e(i)}. To avoid the detrimental memory effect for a changing optical channel, a reset signal is sent periodically to clear the memory arrays and a histogram is rebuilt fresh in accordance with the above rule.

It is to be understood that the embodiments and variations shown and described herein are merely illustrative of the principles of this invention and that various modifications may be implemented by those skilled in the art without departing from the scope and spirit of the invention.

We claim:

1. A receiver for receiving an optical signal carrying a sequence of data thereon, comprising:
    a photo-detector connected to an optical path, carrying said optical signal, for converting said optical signal to an electrical signal having non-Gaussian noise therein; and
    an equalizer for removing intersymbol interference and said non-Gaussian noise from said electrical signal, said equalizer having a plurality of coefficients configured to be updated based upon a first least-mean $2N^{th}$-order (LMN) algorithm, where N is greater than one.

2. The receiver of claim 1, further comprising a coefficient controller to update said coefficients based upon said first least-mean $2N^{th}$-order (LMN) algorithm, where N is greater than one.

3. The receiver of claim 2, wherein said equalizer comprises a finite impulse response filter configured to produce a first output signal responsive to said electrical signal, said first output signal being representative of a sum of the associated electrical signal plus a weighted sum of previous ones of the electrical signal, wherein the previous signals are weighted by said coefficients.

4. The receiver of claim 3, further comprising:
a slicer to produce a predicted signal for each first output signal received from the finite impulse response filter;
a subtractor to produce an error signal proportional to the difference between said first output signal and a corresponding predicted signal or training signal,
wherein said coefficient controller is configured to update said coefficients responsive to the error signal.

5. The receiver of claim 4, wherein said slicer is configured to produce the predicted signal by adaptively determining a slicing threshold.

6. The receiver of claim 4, wherein said equalizer is a feed forward equalizer and said coefficient controller is configured to update a set of said coefficients $\vec{c}(k+1)$ at a time (k+1) as $\vec{c}(k)+\beta N[e(k)]^{2N-1}\vec{u}(k)$, wherein $\beta$ is a preset step size, $\vec{c}(k)$ and $e(k)$ are respective sets of coefficients and error signals at a time k, and $\vec{u}(k)$ is an input signal at the time k.

7. The receiver of claim 3, further comprising:
a first subtractor to produce a second output signal, said second output signal being a sum of one of the first output signals and a corresponding feedback signal;
a slicer to produce a predicted signal in response to each second output signal;
a second subtractor to produce an error signal representing a difference between the second output signal and a corresponding training signal or predicted signal;
a feedback filter to produce the feedback signal in response to corresponding ones of the predicted or training signals, the feedback signal being a weighted sum of the predicted or training signal, wherein weights in the sum being characteristics of the filter; and
a weight controller to update the weights in response to the error signal, the weight controller configured to perform the updates based upon a second least-mean $2N^{th}$-order (LMN) algorithm where N is greater than one.

8. The receiver of claim 7, wherein said equalizer is a decision feedback equalizer and said weight controller is configured to update a set of the weights $\vec{w}(k+1)$ at a time (k+1) as $\vec{w}(k)+\beta N[e(k)]^{2N-1}\vec{r}(k)$, wherein $\beta$ is a preset step size, $\vec{w}(k)$ and $e(k)$ are respective sets of weight and error signals at a time k, and $\vec{r}^T(k)=[\vec{u}(k),-\vec{a}(k)]$, where $\vec{u}(k)$ is an input signal at the time k, and $\vec{a}(k)$ is a predicted or training signal at the time k.

9. The receiver of claim 2, wherein the equalizer is a digital filter.

10. The receiver of claim 1, wherein the equalizer is an analog filter.

11. The receiver of claim 1, wherein said non-Gaussian noise is substantially described by a first component linearly proportional to a noise distribution in said optical signal and a second component proportional to the square of said noise distribution.

12. A method for receiving an optical signal, comprising:
converting said optical signal to an electrical signal having non-Gaussian noise therein;
removing intersymbol interference and said non-Gaussian noise from said electrical signal using an equalizer, wherein said equalizer is configured by a plurality of coefficients; and
updating said plurality of coefficients based upon a least-mean $2N^{th}$-order (LMN) algorithm where N is greater than one.

13. The method of claim 12, wherein said equalizer comprises a finite impulse response filter that is further configured to produce a first output signal responsive to said electrical signal, said first output signal being representative of a sum of the associated electrical signal plus a weighted sum of previous ones of the electrical signal, wherein the previous signals are weighted by said coefficients.

14. The method of claim 13, further comprising the steps of: producing a predicted signal for each first output signal received from the finite impulse response filter;
producing an error signal proportional to the difference between said first output signal and a corresponding one of the predicted signals or a corresponding training signal; and
updating said coefficients responsive to the error signal.

15. The method of claim 14, further comprising the step of updating a set of the coefficients $\vec{c}(k+1)$ at a time (k+1) as $\vec{c}(k)+\beta N[e(k)]^{2N-1}\vec{u}(k)$, wherein $\beta$ is a preset step size, $\vec{c}(k)$ and $e(k)$ are respective set of coefficients and error signals at a time k, and $\vec{u}(k)$ is an input signal at the time k.

16. The method of claim 13, further comprising the steps of:
producing a second output signal, said second output signal being a sum of one of the first output signals and a corresponding feedback signal;
producing a predicted signal in response to each second output signal;
for a particular one of said second output signals, producing an error signal representing a difference between a particular one of said second output signals and a corresponding training signal or predicted signal;
producing the feedback signal in response to corresponding ones of the predicted or training signals, the feedback signal being a weighted sum of the predicted or training signal, wherein weights in the sum being characteristics of the filter; and
updating the weights in response to the error signal with a weight controller configured to perform the updates based upon a Least-mean $2N^{th}$-order (LMN) algorithm where N is greater than one.

17. The method of claim 16, further comprising the step of updating a set of the weights $\vec{w}(k+1)$ at a time (k+1) as $\vec{w}(k)+\beta N[e(k)]^{2N-1}\vec{r}(k)$, wherein $\beta$ is a preset step size, $\vec{w}(k)$ and $e(k)$ are respective sets of weight and error signals at a time k, and $\vec{r}^T(k)=[\vec{u}(k),-\vec{a}(k)]$, where $\vec{u}(k)$ is an input signal at the time k, and $\vec{a}(k)$ is a predicted or training signal at the time k.

18. The method of claim 14, wherein said non-Gaussian noise is substantially described by a first component linearly proportional to a noise distribution in said optical signal and a second component proportional to the square of said noise distribution.

* * * * *